United States Patent [19]
Nakai

[11] Patent Number: 4,636,704
[45] Date of Patent: Jan. 13, 1987

[54] BATTERY CHARGING CIRCUIT

[75] Inventor: Shinichi Nakai, Hiroshima, Japan

[73] Assignee: Ryobi Limited, Hiroshima, Japan

[21] Appl. No.: 753,256

[22] Filed: Jul. 9, 1985

[30] Foreign Application Priority Data
Jul. 9, 1984 [JP] Japan ............................ 59-103966[U]

[51] Int. Cl.⁴ ............................................... H02J 7/04
[52] U.S. Cl. ......................................... 320/35; 320/31; 320/39
[58] Field of Search ........................ 320/21, 35, 36, 39, 320/40, 57, 59, DIG. 2

[56] References Cited
U.S. PATENT DOCUMENTS

| | | | |
|---|---|---|---|
| 3,652,915 | 3/1972 | Eberts | 320/35 X |
| 3,911,351 | 10/1975 | Saslow | 320/35 X |
| 4,006,397 | 2/1977 | Catoti et al. | 320/35 X |
| 4,528,492 | 7/1985 | Inaniwa | 320/36 |

FOREIGN PATENT DOCUMENTS
3340944 5/1984 Fed. Rep. of Germany ........ 320/35

Primary Examiner—R. J. Hickey
Attorney, Agent, or Firm—Finnegan, Henderson, Farabow, Garrett & Dunner

[57] ABSTRACT

A circuit for charging a battery having a charge-completion signal generator, e.g., a thermostat, that is turned off when the temperature of a rechargeable battery or cell has reached the level corresponding to charge completion. A constant-current circuit controls the charging current. A light-emitting element is lit by current for controlling the constant-current circuit. A silicon-controlled rectifier operates in conjunction with a switching element upon receiving an external charge-completion signal to cause the constant-current circuit to stop operating and remain off by detecting the cell voltage even after the external charge-completion signal has been cut off.

4 Claims, 1 Drawing Figure

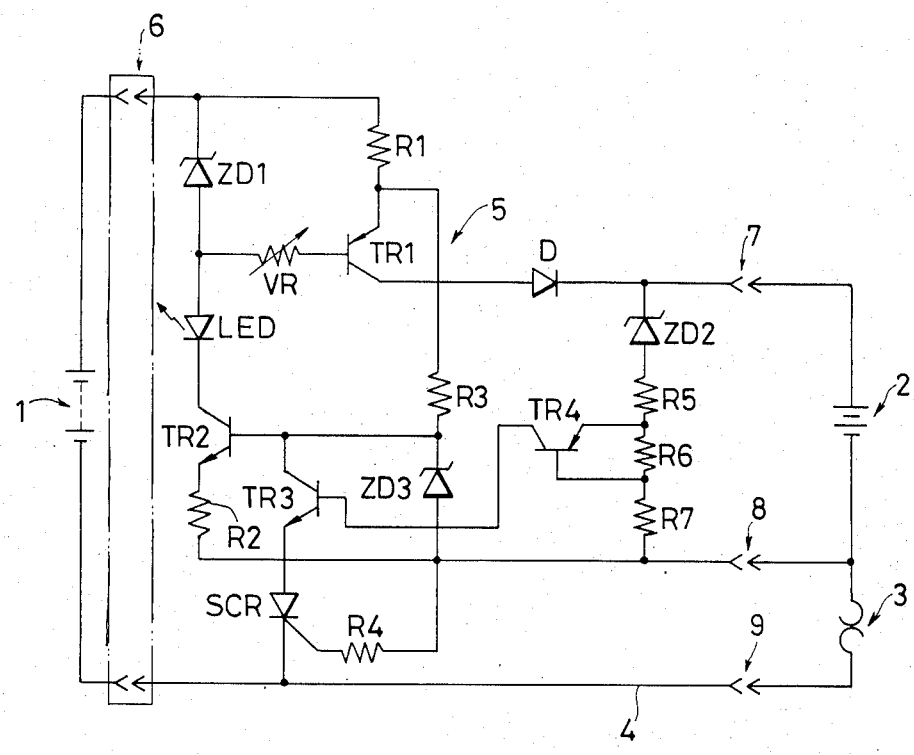

BATTERY CHARGING CIRCUIT

BACKGROUND OF THE INVENTION

1. Field of the Invention

This invention relates to a charging circuit for a rechargeable cell such as a nickel-cadmium cell.

2. Description of the Prior Art

In a conventional charging circuit, it is arranged so that a power source is caused to supply a constant current to a cell and the cell is prevented from being recharged while a thermostat is reset after the charging circuit is automatically turned off as the cell has been charged completely. However, the disadvantage is that such a conventional charging circuit is not only complicated in construction but also costly because the circuit comprises a trigger switch, a relay and other elements.

SUMMARY OF THE INVENTION

An object of the present invention is to provide a charging circuit capable of maintaining the electrical quality of a cell by causing a power source to supply the cell with a constant current, letting the source stop supplying the current on receiving a charge-completion signal and preventing the cell from being recharged by detecting the cell voltage even after the charge-completion signal has been turned off.

Another object of the present invention is to provide a charging circuit less costly and simple in construction using semiconductors.

In order to achieve these and other objects of the present invention, there is provided a circuit for charging a battery. The circuit includes a constant-current circuit for controlling charge current to the battery and means for generating a charge completion signal upon completion of the charge of the battery. The circuit further includes means responsive to the battery voltage for generating a control signal when the battery voltage reaches a predetermined lebel. A switching element, having a pair of output terminals and an input terminal, has its input terminal connected to the means responsive to the battery voltage, thereby establishing a low impedance path across the switching element output terminal upon generation of the control signal. A silicon-controlled rectifier comprising a pair of output terminals is connected in series with the switching element output terminals. The silicon-controlled rectifier has an input terminal connected to the charge-completion signal generating means and establishes a low impendance path across the silicon-controlled rectifier output terminals upon generation of the charge-completion signal, thereby maintaining a low impedance path across the silicon-controlled rectifier output terminals even after the charge-completion signal is deactivated. The switching element and the silicon-controlled rectifier are coupled to the constant-current circuit and cause the constant-current circuit to interrupt the charging current to the battery when a low impedance path is present across the series combination of the switching element output terminals and the silicon-controlled rectifier output terminals. In this manner, charging current to the battery remains off even after the charge-completion signal is deactivated.

Preferably, the charge-completion signal generating means is a thermostat. It is further preferred that the switching element comprises a transistor.

BRIEF DESCRIPTION OF THE DRAWING

The accompanying drawing is an electric circuit diagram of a battery charging circuit embodying the present invention.

DESCRIPTION OF THE PREFERRED EMBODIMENT

The present invention will be disclosed by means of a preferred embodiment.

In accompanying drawing, there is shown an embodiment of an electric circuit comprising a power supply 1, a battery of rechargeable cells 2, a thermostat 3, a charging circuit 4, a constant-current circuit 5, a power supply plug 6, electrodes 7,8,9, transistors TR1, TR2, TR3, Zener diodes ZD1, ZD2, ZD3, resistors R1~R7, a diode D, a light emitting diode LED for indicating charging operation, a silicon controlled rectifier SCR, and a variable resistor VR.

In the circuit thus arranged, if a constant voltage is applied by the Zener diode ZD3 to the base of the transistor TR2 through the resistor R3 and a constant bias current is caused to flow through the collector thereof, the light emitting element LED connected to the collector of the transistor TR2 will light while charging operation is being conducted. The charging current intensity is determined to meet the requiremnts where the sum obtained by adding the voltage drop caused by the resistor R1 to the voltage across the emitter and base of the transistor TR1 and the voltage drop caused by the variable resistor VR becomes equal to the constant voltage by means of the Zener diode ZD1.

Accordingly, the charging current can be adjusted to a given value using the variable resistor VR.

When the cell 2 is charged with voltage exceeding the constant voltage of the Zener diode ZD2, the current will flow through the resistors R5, R6, R7, causing the transistor TR4 to be turned on. Consequently, the transistor TR3 is on.

If the temperature of the cell 2 reaches a set value as the charging operation progresses, the thermostat 3 will be turned off and the current caused to flow through the resistor R4 thereby will turn the silicon controlled rectifier SCR on. The transistor TR2 is turned off at that point of time and the light emitting element LED will also discontinue to light. The turn-off of thermostat 3 thus constitues a charge-completion signal.

Although the thermostat 3 will be turned on if the temperature of the cell drops a short time later, the transistor TR2 remains off even though the thermostat 3 is turned on, thus preventing the charging operation from being restarted.

The battery charging circuit thus arranged according to the present invention is capable of causing a power source to supply a cell with a constant current and, on recieving an external charge-completion signal, causes a constant-current circuit 5 to stop operating. As the circuit is able to hold the constant-current circuit off by detecting the cell voltage even after the external signal has been cut off, the charging operation can be prevented from being restarted. Accordingly, the cell 2 can be charged while its electric quality is maintained and the charge completion is identified when a light emitting element LED discontinues emitting light. However, the circuit can be made less complicated and expensive effectively compared with any conventional one because semiconductors are used.

The present invention has been disclosed in terms of a preferred embodiment. The scope of the invention is, however, not limited thereto. The scope of the invention is determined by the appended claims and their equivalents.

What is claimed is:

1. A circuit for charging a battery, comprising:

a constant-circuit for controlling current to the battery;

means for generating a charge completion signal upon completion of the charge of the battery;

means responsive to the battery voltage when it reaches a predetermined point for generating a control signal;

a switching element having a pair of output terminals and an input terminal, said switching element input terminal being connected to said responsive means and establishing a low-impedance path across said switching element input terminals upon generation of said control signal;

a silicon-controlled rectifier comprising a pair of output terminals connected in series with said switching element output terminals, said silicon-controlled rectifier having an input terminal connected to said charge-completion signal generating means and establishing a low-impedance path across said silicon-controlled rectifier output terminals upon generation of said charge completion signal and maintaining a low-impedance path across said silicon-controlled rectifier output terminals while said low impedance path is established across said switching element output terminals; and said switching and said silicon-controlled rectifier being coupled to said constant-current circuit and causing said constant-current to interrupt charging current to the battery whenever a low-impedance path is present across the series combination of said switching element output terminals and silicon-controlled rectifier output terminals;

whereby charging current to the battery remains off even after said charge completion signal is deactivated at times when said control signal is being generated.

2. A circuit as recited in claim 1 wherein said charge completion signal generating means comprises circuit means including a thermostat.

3. A circuit as recited in claim 1 wherein said switching element comprises a transistor.

4. A circuit as recited in claim 1 further comprising light-emitting means for providing an indication of the presence of said charging current.

* * * * *